(12) United States Patent
Cox et al.

(10) Patent No.: US 12,234,163 B2
(45) Date of Patent: Feb. 25, 2025

(54) HYDRODYNAMIC CAVITATION SYSTEM FOR THE REMOVAL OF UNWANTED, TOXIC, OR CONTAMINATED ORGANIC AND INORGANIC COMPOUNDS

(71) Applicant: Phoenix Lake, Inc., St. George, UT (US)

(72) Inventors: Jamie Cox, St. George, UT (US); Tané Remington, Livermore, CA (US)

(73) Assignee: 8215 Technology, Inc., St. George, UT (US)

( * ) Notice: Subject to any disclaimer, the term of this patent is extended or adjusted under 35 U.S.C. 154(b) by 262 days.

(21) Appl. No.: 17/932,588

(22) Filed: Sep. 15, 2022

(65) Prior Publication Data

US 2023/0077333 A1    Mar. 16, 2023

Related U.S. Application Data

(60) Provisional application No. 63/322,744, filed on Mar. 23, 2022, provisional application No. 63/244,528, filed on Sep. 15, 2021.

(51) Int. Cl.
*C02F 1/34* (2023.01)
*C02F 1/72* (2023.01)
(Continued)

(52) U.S. Cl.
CPC ............... *C02F 1/34* (2013.01); *C02F 1/722* (2013.01); *C02F 1/78* (2013.01); *F04D 29/2277* (2013.01);
(Continued)

(58) Field of Classification Search
CPC ................... B01J 19/008; C02F 1/34
See application file for complete search history.

(56) References Cited

U.S. PATENT DOCUMENTS 3,476,219 A    11/1969 Lauer
5,732,891 A    3/1998 Langenecker
(Continued)

FOREIGN PATENT DOCUMENTS

CA    3023102 A1    5/2016
CA    3081337 A1    5/2019
(Continued)

*Primary Examiner* — Brian O Peters
(74) *Attorney, Agent, or Firm* — Gurr & Brande, PLLC; Robert A. Gurr

(57) ABSTRACT

An advanced hydrodynamic cavitation system includes a housing, a first stator with angled ridges, a second stator that is circular with angled ridges, a rotor having rotor blades housed within the second stator, and a driveshaft, and is configured to work with a motor, a pump, and oxidizing agents such as hydrogen peroxide or ozone to form free radicals. Hydrodynamic cavitation occurs (1) on the leading edge of the rotor blades; (2) in the constriction between the rotor blades, depending on the design; (3) in the gap between the first stator and the rotor blades; and (4) in the gap between the second stator and the rotor blades. The four cavitation regions may coalesce to become a steady-state supercavitation cloud that removes unwanted, toxic or contaminated organic and inorganic compounds, specifically with the ability to treat and decontaminate sludge, wastewater, ballast water, drinking water, harmful algal blooms, and biomedical waste.

20 Claims, 13 Drawing Sheets

(51) Int. Cl.
*C02F 1/78* (2023.01)
*F04D 29/22* (2006.01)

(52) U.S. Cl.
CPC .... *F04D 29/2288* (2013.01); *C02F 2201/002* (2013.01)

(56) References Cited

U.S. PATENT DOCUMENTS

| | | |
|---|---|---|
| 6,601,787 B1 | 8/2003 | Langenecker |
| 6,651,914 B1 | 11/2003 | Langenecker |
| 7,306,737 B2 | 12/2007 | Langenecker |
| 7,770,830 B1 | 8/2010 | Langenecker et al. |
| 8,021,557 B2 | 9/2011 | Langenecker et al. |
| 2004/0232006 A1 | 11/2004 | Kazem |
| 2007/0140052 A1 | 6/2007 | Kozyuk |
| 2008/0236160 A1* | 10/2008 | Glotov ............... B01F 25/641 60/530 |
| 2014/0316180 A1 | 10/2014 | Fomitchev-Zamilov |
| 2016/0052621 A1 | 2/2016 | Ireland et al. |
| 2016/0167983 A1 | 6/2016 | Sirok et al. |
| 2018/0369470 A1* | 12/2018 | Garvey ............... A61J 1/00 |
| 2021/0180833 A1 | 6/2021 | McKie |
| 2021/0237007 A1 | 8/2021 | Gordon et al. |

FOREIGN PATENT DOCUMENTS

| | | |
|---|---|---|
| CN | 102351285 A | 2/2012 |
| CN | 101913724 B | 7/2012 |
| CN | 103224277 B | 3/2014 |
| CN | 103787526 A | 5/2014 |
| CN | 103395898 B | 9/2014 |
| CN | 106115897 B | 2/2019 |
| CN | 109796061 A | 5/2019 |
| CN | 108585283 B | 12/2020 |
| EP | 3030343 B1 | 6/2016 |
| JP | 2010517776 A | 5/2010 |
| KR | 101874874 B1 | 7/2018 |
| RU | 183943 U1 | 10/2018 |
| WO | 2019002951 A1 | 1/2019 |

\* cited by examiner

HYDRODYNAMIC CAVITATION SYSTEM FOR THE REMOVAL OF UNWANTED, TOXIC, OR CONTAMINATED ORGANIC AND INORGANIC COMPOUNDS

CROSS-REFERENCE TO RELATED APPLICATIONS

This application claims the benefit of U.S. Provisional Application Ser. No. 63/244,528, filed on Sep. 15, 2021, and U.S. Provisional Application Ser. No. 63/322,744, filed on Mar. 23, 2022, both of which are incorporated herein by reference.

TECHNICAL FIELD

The present disclosure relates to hydrodynamic cavitation systems. More particularly, the present disclosure relates to an advanced hydrodynamic cavitation system for the removal of unwanted, toxic, or contaminated organic and inorganic compounds including, but not limited to, the decontamination of sludge, wastewater, ballast water, drinking water, harmful algal blooms, and biomedical waste.

BACKGROUND

Hydrodynamic cavitation is the process of vaporization and bubble implosion which occurs in a flowing liquid as a result of a rapid decrease and subsequent increase in local pressure by means of mechanical constriction. The implosion of bubble cavities at localized areas yields turbulence, high temperature hotspots up to 4500° C., high pressures up to 1000 bar, oxidation, free radicals, shear forces, and shock waves. These disruptive and dynamic changes can be destructive to microorganisms in liquid causing cells to lyse. In particular, hydrodynamic cavitation has potential applications in the decontamination of sludge, wastewater, ballast water, drinking water, harmful algal blooms (HAB), and biomedical waste.

The present disclosure relates to the field of environmental technology; more specifically, the present disclosure relates to a method for the decontamination of liquids. Contaminated liquids, whether it be sludge, wastewater, biosolids, or harmful algal blooms, present health risks to humans, animals, and the environment. The apparatus disclosed herein can be used for a multitude of different applications that require remediation, treatment, and decontamination of liquids that may also have suspended or heterogeneous solid components. Harmful algal blooms are just one subset of contaminated water that the apparatus can treat but a unique one at that. Due to rising temperatures and nutrient rich runoffs, HABs are an escalating problem worldwide that has forced many concerned individuals and countries to seek remediation methods to curtail its spread. HABs are rapidly growing cyanobacteria, also known as blue-green algae. Cyanobacteria are prokaryotic organisms without cell organelles, but instead have vacuoles housing toxic gas. The HAB producing toxins can come from either of the two strains of the Anabaena flosaquae, as well as the Aphanizomenon flosaquae, Microcystis aeruginosa, and Nodularia species that can exist in saltwater and freshwater. Cyanobacteria further deplete dissolved oxygen, prevent light penetration, and reduce gas exchange in the water, causing detrimental environmental impacts. In addition to creating potentially hazardous health issues, including for land animals that visit waters infested with HABs, it poses a threat to local and regional economies where commercially harvested seafood is a dominant source of income.

There are currently three traditional methods for combating HAB. The first method is the chemical treatment of the water, which can include copper-based algaecides, biosurfactants, herbicides, photosensitizers, and chemical flocculants. While chemical treatment may destroy HABs, there are still many disadvantages in using chemicals, such as the following: (1) chemical treatment does not specifically target HABs, putting all organisms in the body of water at risk from the toxic effects; (2) chemical treatment produces secondary pollution; and (3) the heavy-metal residue leftover from chemical treatment becomes a permanent a part of the water ecosystem, creating new problems all of its own.

The second method involves a biological approach, where macroalgae, grazers, predator enhancements, bacteria/viruses, and phytoplanktivorous fish are introduced into the water system. This may seem to be the most environmentally friendly of the three methods; however, biomanipulation requires long lead times while also introducing unknown elements into the water ecosystem that cannot be predicted, making this method potentially risky.

The third method involves physical removal, where ultrasonic, centrifugal, net removal, sediment-based methods, and adsorbent techniques can be utilized. The shortcomings to the listed physical removal techniques are the substantial required energy cost, as well as limitations in scaling HAB removal from small lakes and ponds to expansive coastlines, among others.

The present disclosure is capable of eliminating toxic cells such as cyanobacteria, but this ability can also be used to treat unwanted biomedical waste through the same means. Biomedical waste is hazardous and must therefore be disposed of in a manner that neutralizes drugs, contaminants, and other organisms. Incineration and autoclaving are two of the main techniques used to dispose of biomedical waste. Other techniques include microwaving or chemical treatment. While incineration is the most efficient and simple technique for biomedical waste disposal, the process creates nano particulates in the ash and air that are extremely harmful to the environment and humans. As a result, incineration has now been discontinued at most of the fifty-five biomedical waste sites in the United States, leaving only a few with authority to continue using the technique. Alternative remedies such as autoclaving, chemical treatments, and microwaving are expensive and ultimately ineffective at disposing of all schedule drugs.

Accordingly, there remains a need for a method and apparatus that removes organic and inorganic compounds from liquids and has practical applications for sludge, wastewater, HAB remediation, and the disposal of biomedical waste without biomanipulation, prefiltration, secondary chemical treatment, secondary pollution, and limitations in scaling due to excessive operations costs. The present disclosure seeks to solve these and other problems.

SUMMARY OF EXAMPLE EMBODIMENTS

In some embodiments, a hydrodynamic cavitation system comprises a cavitation apparatus that includes a housing having a fluid inlet and a fluid outlet. The cavitation apparatus further comprises a first stator that may be coupled to the housing having a backplate with angled ridges, a second stator coupled to the first stator that may be circular with angled ridges on an interior surface, a rotor located within the second stator having one or more rotor blades coupled to one or more slots, a driveshaft, a motor, a pump, and oxidative agents such as hydrogen peroxide or ozone that create free radicals. In some embodiments, the rotor blades may comprise a first ridge, a second ridge, and a constriction between the first and second ridges. Hydrodynamic cavitation may occur (1) on the leading edge of the rotor blades; (2) in the constriction between the two ridges of the rotor blades; (3) in the gap between the first stator and the rotor; and (4) in the gap between the second stator and the rotor blades. It will be appreciated that the rotor blades need not comprise a constriction between first and second ridges. Additionally, in some embodiments, a plurality of rotor blades are positioned around the outer surface of the rotor, from a leading edge of the rotor to a rear edge of the rotor, at spaced intervals. In some embodiments, the plurality of rotor blades are non-linear and are angled in relation to the rotor.

In some embodiments, a hydrodynamic cavitation system comprises a cavitation apparatus that includes a housing having a fluid inlet and a fluid outlet. The cavitation apparatus further comprises a first stator that may be coupled to the housing having a backplate with angled ridges, a second stator coupled to the first stator that may be circular and conical with angled ridges on an interior surface, a rotor located within the second stator having one or more rotor blades coupled to one or more slots, the rotor being configured complementary in shape to the second stator, a driveshaft, a motor, a pump, a fluid inlet valve, a fluid outlet valve, piping connecting the fluid inlet valve with a holding tank, a continuous mixer, a hydrophone, a pressure gauge, a digital flowmeter, and oxidative agents such as hydrogen peroxide or ozone that create free radicals.

In some methods of use, the method comprises pumping fluid into the hydrodynamic cavitation system through the fluid inlet, actuating the driveshaft causing rotation of the rotor, generating hydrodynamic cavitation on the leading edge of one or more rotor blades, generating hydrodynamic cavitation in the constriction between the rotor blades or between the first and second ridges of the rotor blades, generating hydrodynamic cavitation in the gap between the first stator and the rotor, generating hydrodynamic cavitation in the gap between the second stator and the rotor blades, and emitting the fluid through the fluid outlet.

DETAILED DESCRIPTION OF EXAMPLE EMBODIMENTS

Figure 1:
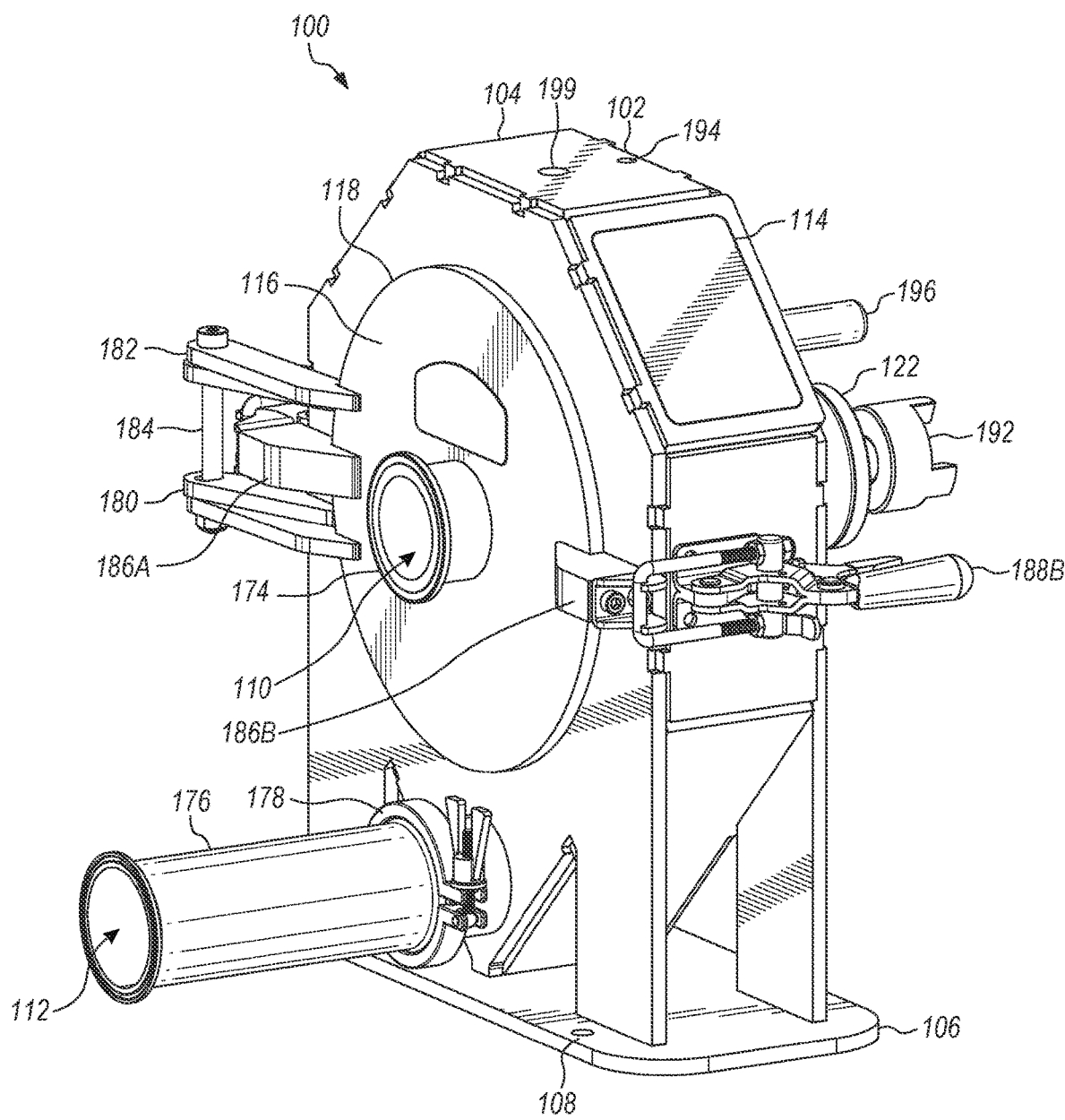
FIG. 1 illustrates a front, side perspective view of a hydrodynamic cavitation system.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, HABs harm humans, animals, and economies around the globe. The traditional remediation methods for combating HAB in saltwater and freshwater bodies, including chemical treatment, biological approaches, and physical removal, each have disadvantages. These disadvantages include introducing harmful chemicals to an already impaired ecosystem, the inability to scale from small to large bodies of water, and the financial risk in the face of diminishing returns, among others.

Likewise, the disposal of medical waste by incineration, autoclaving, chemical treatments, and microwaving each have disadvantages. Incineration is being discontinued due to dangerous emissions and ash residue, while the alternative techniques cannot be applied successfully to the disposal of all biomedical waste.

Thus, there remains a need for a system that breaks down organic and inorganic compounds for use in various industrial applications, including the remediation of HABs and the disposal of biomedical waste, without biomanipulation, prefiltration, secondary treatment, secondary pollution, and limitations in scaling due to energy cost constraints. The hydrodynamic cavitation system described herein solves these problems and many others.

Figure 2:
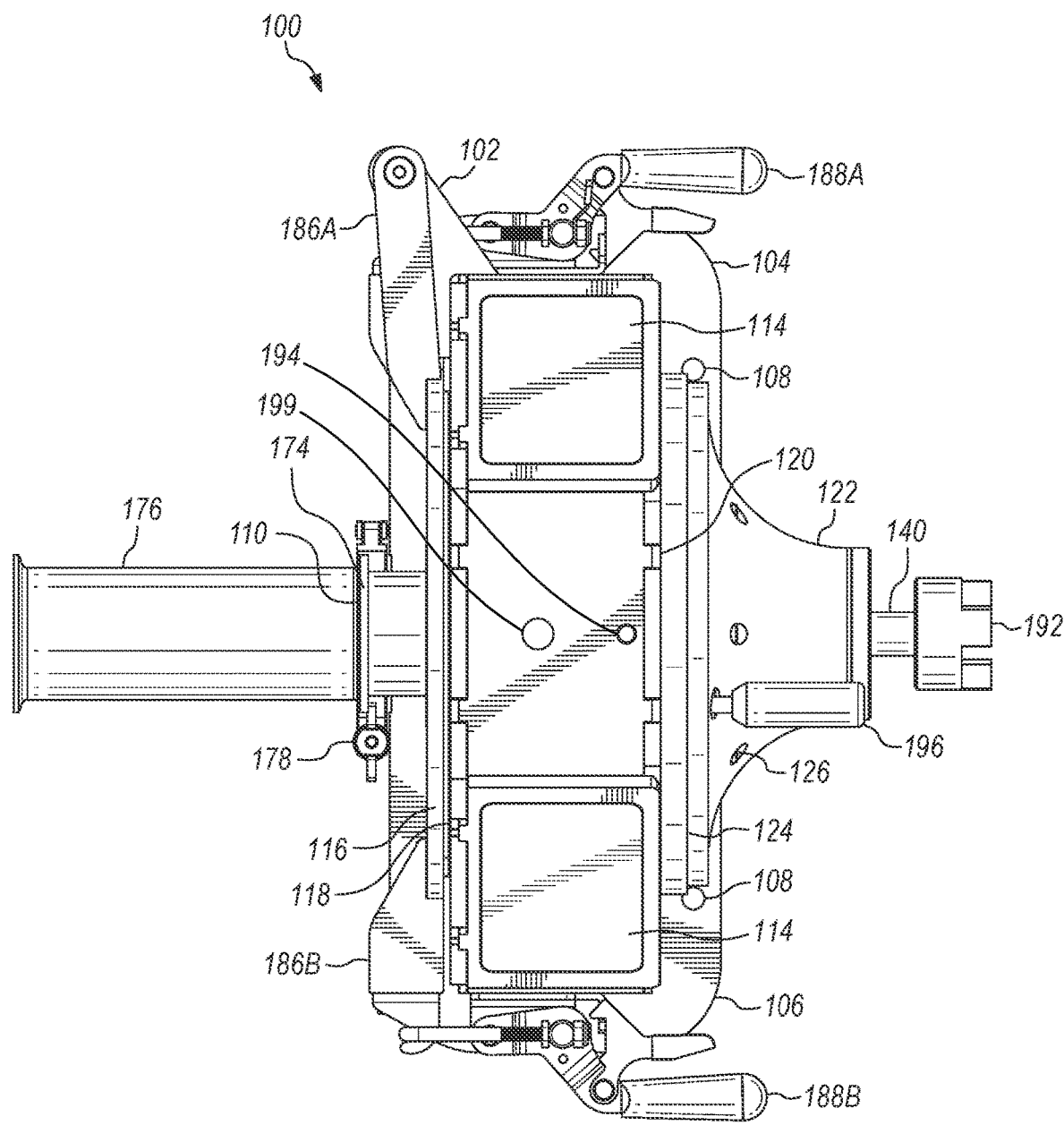
FIG. 2 illustrates a top plan view of a cavitation apparatus of a hydrodynamic cavitation system.
Figure 3:
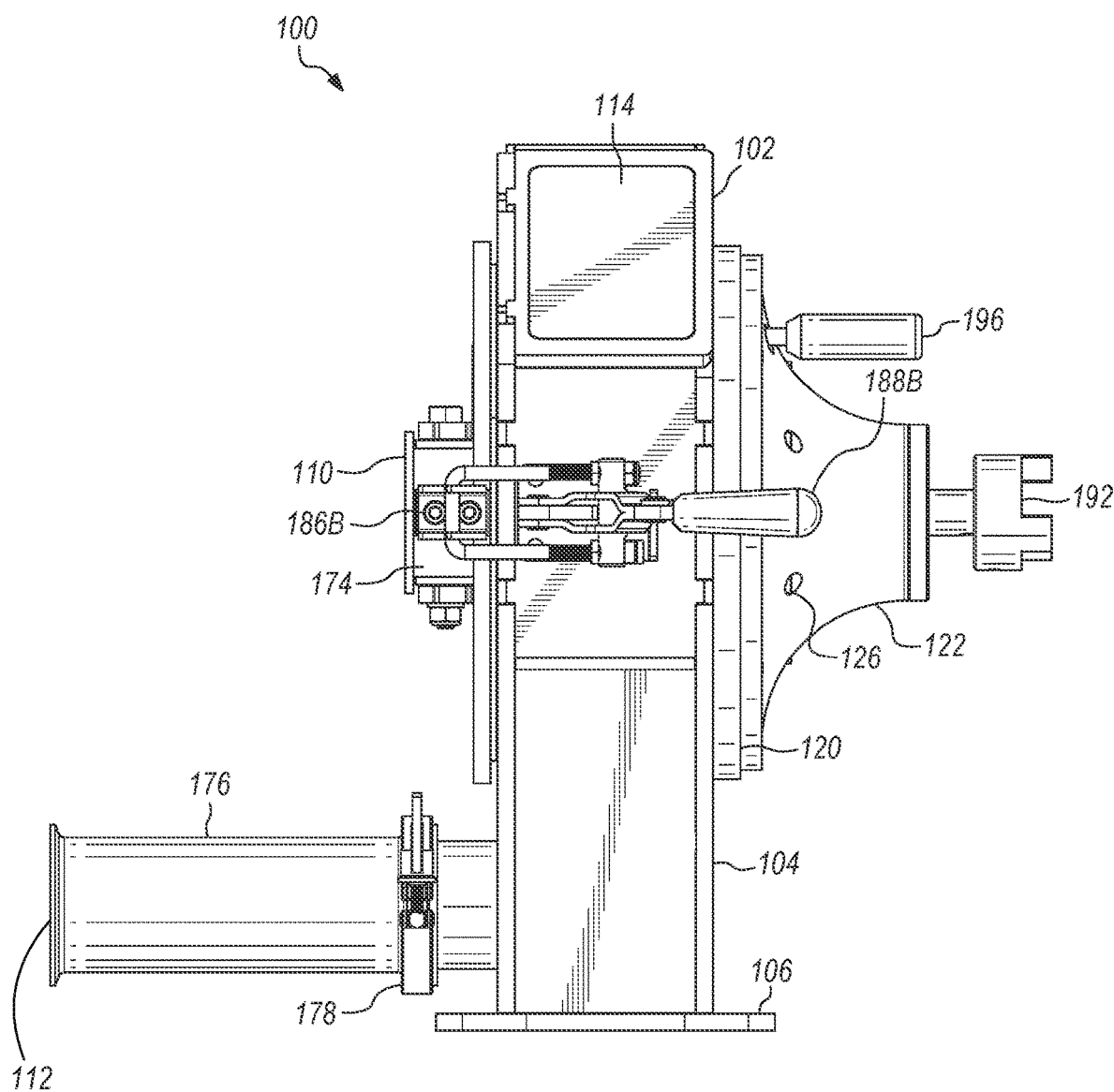
FIG. 3 illustrates a left side elevation view of a cavitation apparatus of a hydrodynamic cavitation system.

In some embodiments, as illustrated in FIGS. 1-3, a hydrodynamic cavitation system 100 comprises a cavitation apparatus 102 that includes a housing 104. The housing 104 may be symmetrical or unsymmetrical and manufactured from a variety of materials, such as steel, aluminum, fiberglass, plastics, carbon fibers, etc. The housing 104 may comprise a base 106 with one or more securing apertures 108 so as to be coupled to another object or surface. The housing 104 may comprise a fluid inlet 110 and a fluid outlet 112, which are not limited to locations specified in the figures. The cavitation apparatus 102 may comprise inlet pipe 174 coupled to a fluid inlet valve (not shown) which regulates the flow rate of fluid into the cavitation system 100. The fluid outlet 112 may comprise an outlet extension pipe 176, which may be secured to the fluid outlet 112 via a clamp 178. The housing 104 may also comprise a first aperture 118 that receives a door 116 and a second aperture 120 that may receive a driveshaft housing 122.

In some embodiments, the fluid inlet 112 may be integrated with the door 116. The housing 104 may comprise a first hinge 180 and a second hinge 182 coupled together by a rod 184, wherein the first and second hinges 180, 182 are coupled to a door 116. The door 116 may be opened and sealed by securing and releasing one or more clamps 186A-B on either side of the door 116 that are actuated by a handle 188A-B. The housing 104 may comprise one or more transparent windows 114A-B for viewing the components inside the housing 104, although not required.

Figure 4:
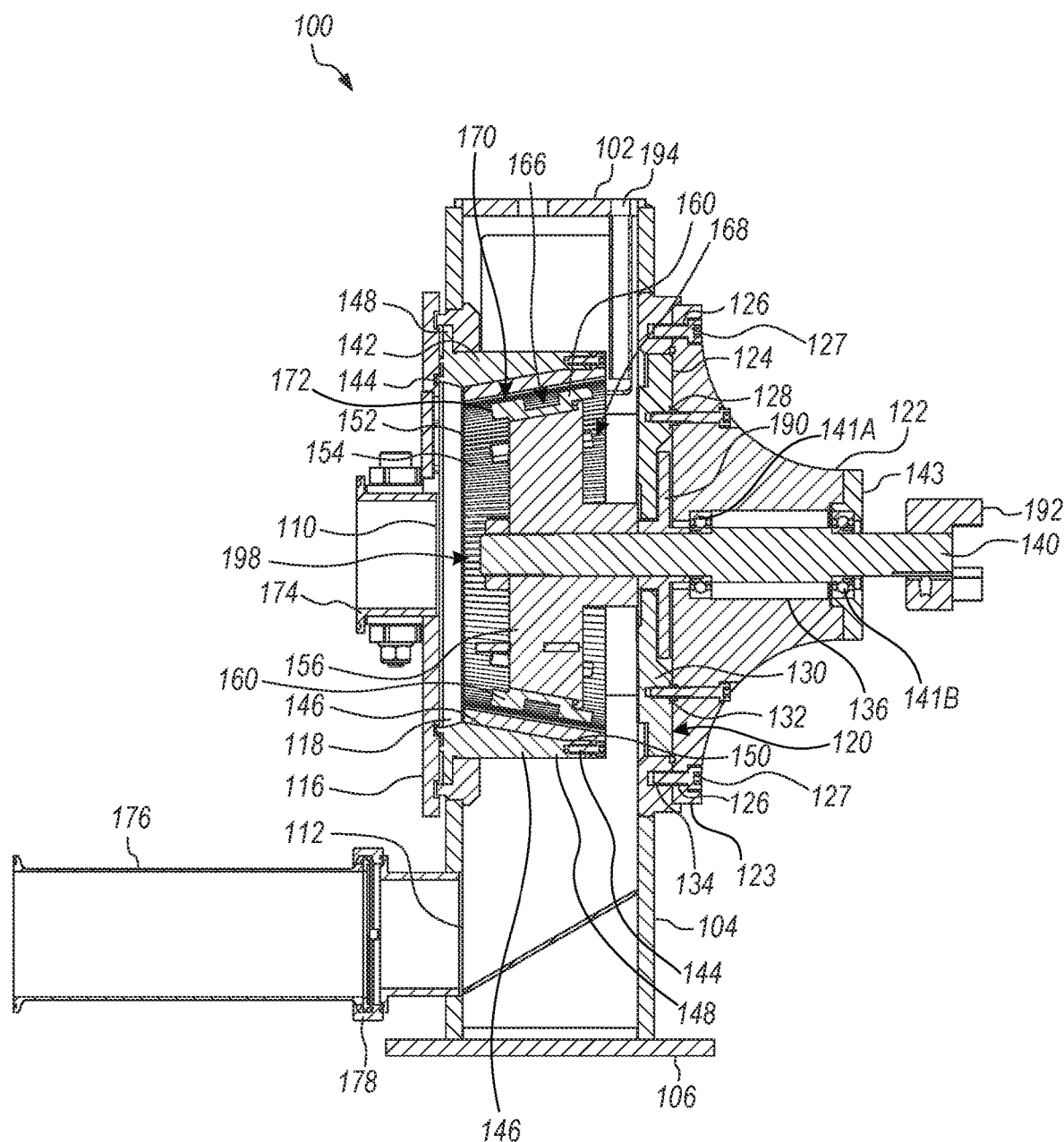
FIG. 4 illustrates a side, sectional view of a hydrodynamic cavitation system.
Figure 5:
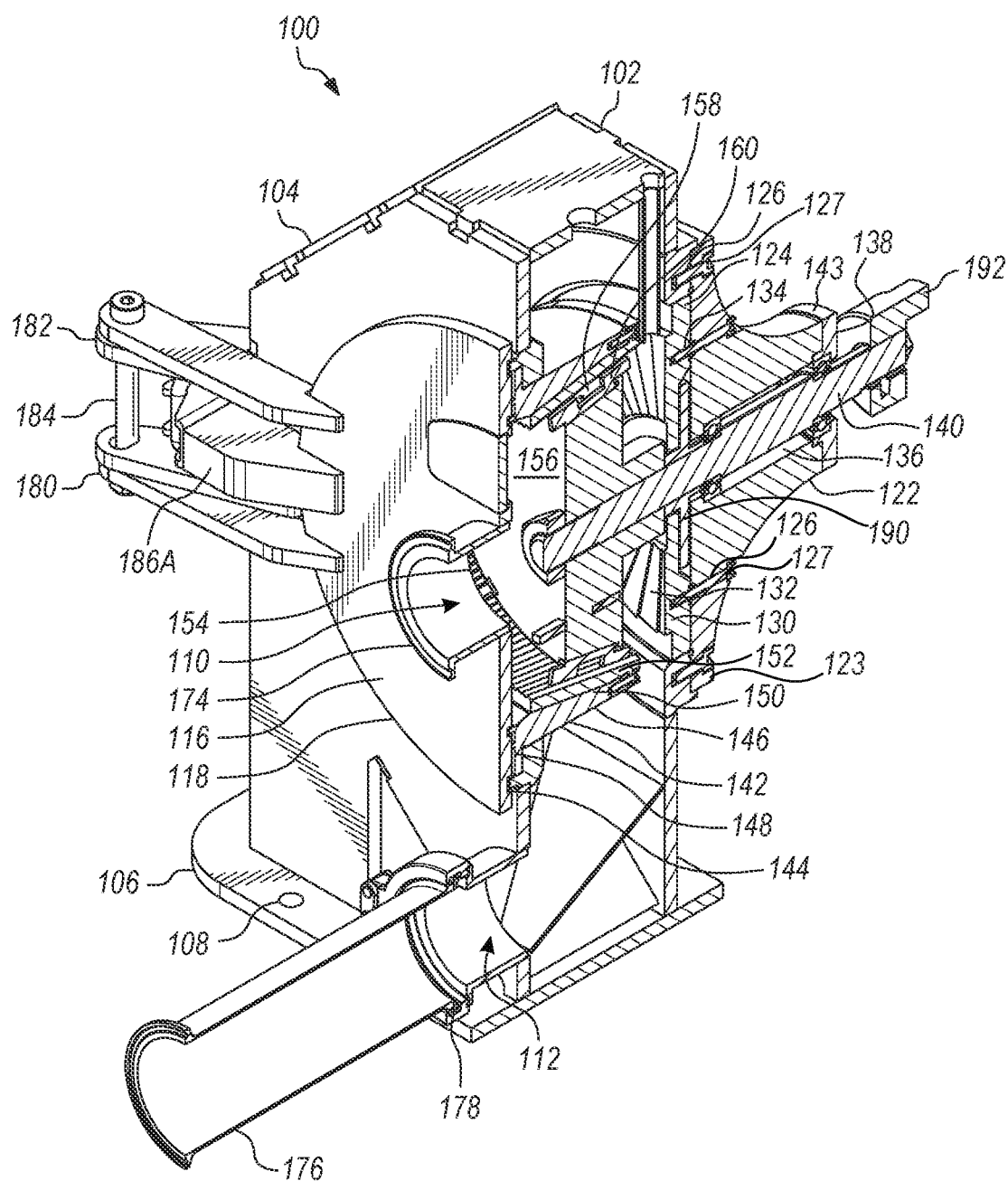
FIG. 5 illustrates front, side perspective sectional view of a hydrodynamic cavitation system.
Figure 6:
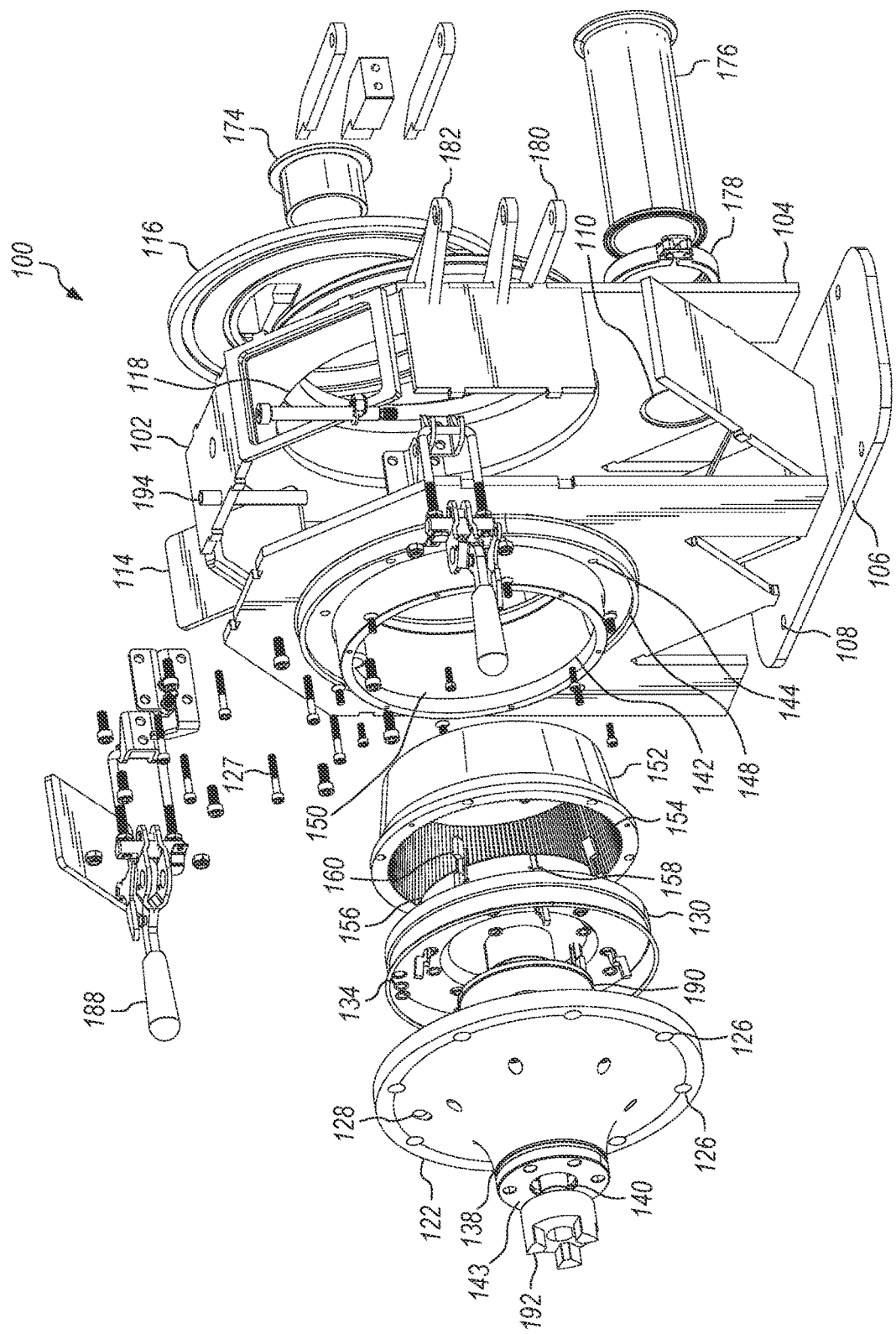
FIG. 6 illustrates an exploded view of a cavitation apparatus of a hydrodynamic cavitation system.

As shown in FIGS. 4-6, a front 124 of the driveshaft housing 122 may comprise a plurality of housing apertures 126 and a first plurality of stator apertures 128 so as to receive a plurality of fasteners 127, such as bolts or screws. The front 124 of the driveshaft housing 122 may receive a first stator 130. The first stator 130 may be a back plate that comprises angled ridges 132 (FIG. 5) on a first side that faces the first aperture 118 of the housing 104 when coupled to the driveshaft housing 122. The first stator 130 comprises a second plurality of stator apertures 134. The first stator 130 may be coupled to the driveshaft housing 122 via a plurality of fasteners 127 that pass through the second stator apertures 134 and the first stator apertures 128. The front 124 of the driveshaft housing 122 may comprise a flange 123 that directly contacts the housing 104 while circumscribing the second aperture 120. A plurality of fasteners 127 may be placed through the plurality of housing apertures 126, thereby coupling the driveshaft housing 122 to the housing 104.

The driveshaft housing 122 comprises a cylindrical channel 136 from the front 124 to a rear 138 of the driveshaft housing 122. A driveshaft 140 may be positioned within the cylindrical channel 136 and extend therefrom along a longitudinal axis of the driveshaft housing 122. The driveshaft 140 may comprise a hub 192 on a distal end of the driveshaft 140 that is configured to be coupled to a motor. The driveshaft 140 may be coupled to a deflector 190, a permanently lubricated stainless steel ball bearing 141A-B (best seen in FIG. 4), and a seal retainer 143, each configured to facilitate the actuation (i.e., rotation) of the driveshaft 140.

A stator retainer 142 may be coupled to the housing 104 at the first aperture 118. The stator retainer 142 may comprise a flange 148 with flange apertures 144 that each receive a fastener 127 so as to couple the stator retainer 142 to the housing 104. The stator retainer 142 may comprise a circular body 146 that extends into the housing 104. In some embodiments, an inner side 150 of the circular body 146 of the stator retainer 142 may be angled or tapered. The cavitation apparatus 102 further comprises a second stator 152 that may be circular and have angled ridges 154. The second stator 152 may be stationary and angled/tapered so as to be mated with the angle of the inner side 150 of the stator retainer 142.

Figure 7:
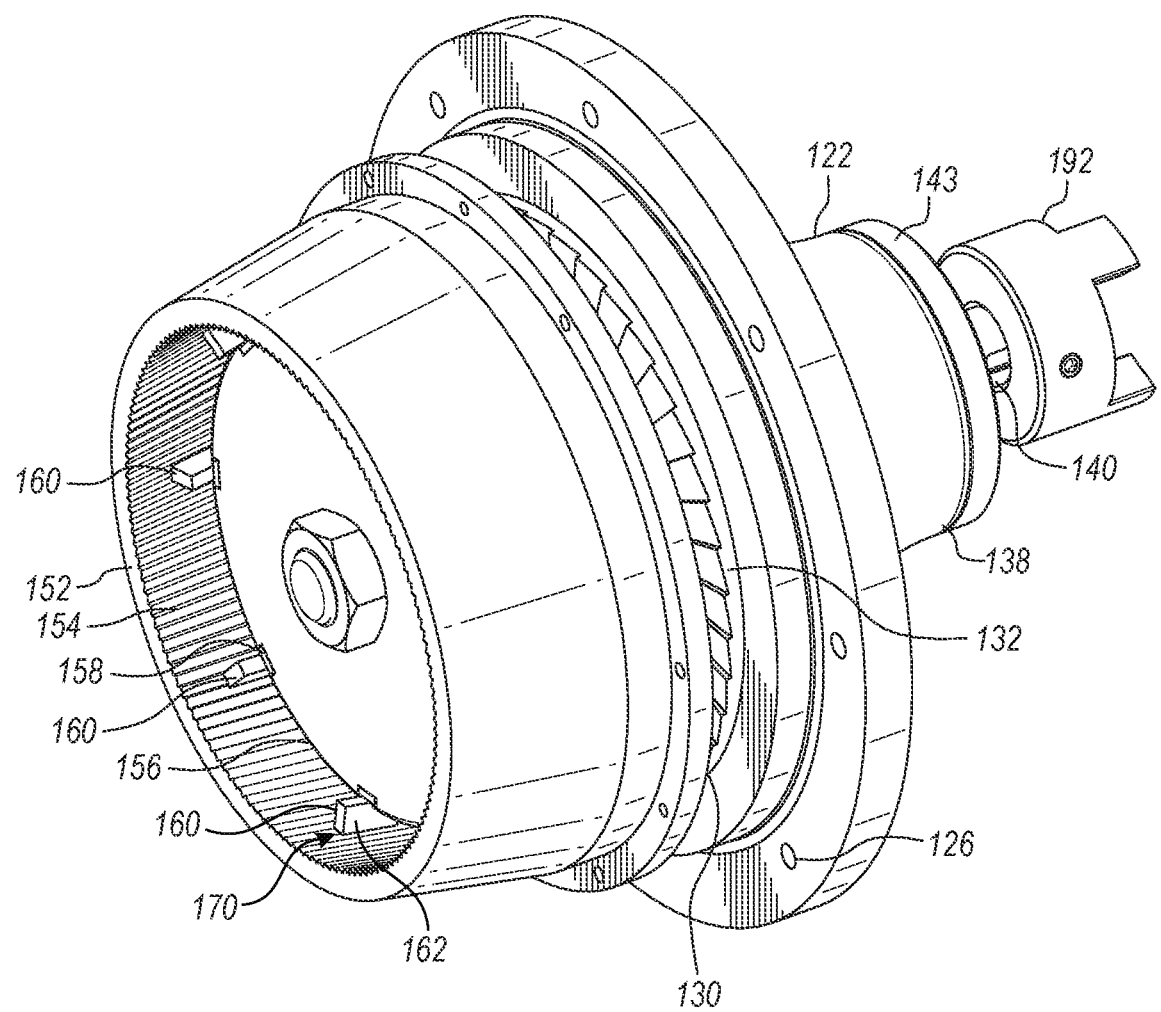
FIG. 7 illustrates a detailed front, side perspective view of a rotor, a second stator, a back plat stator, rotor blades, a driveshaft, and a driveshaft housing of a cavitation apparatus of a hydrodynamic cavitation system.
Figure 8:
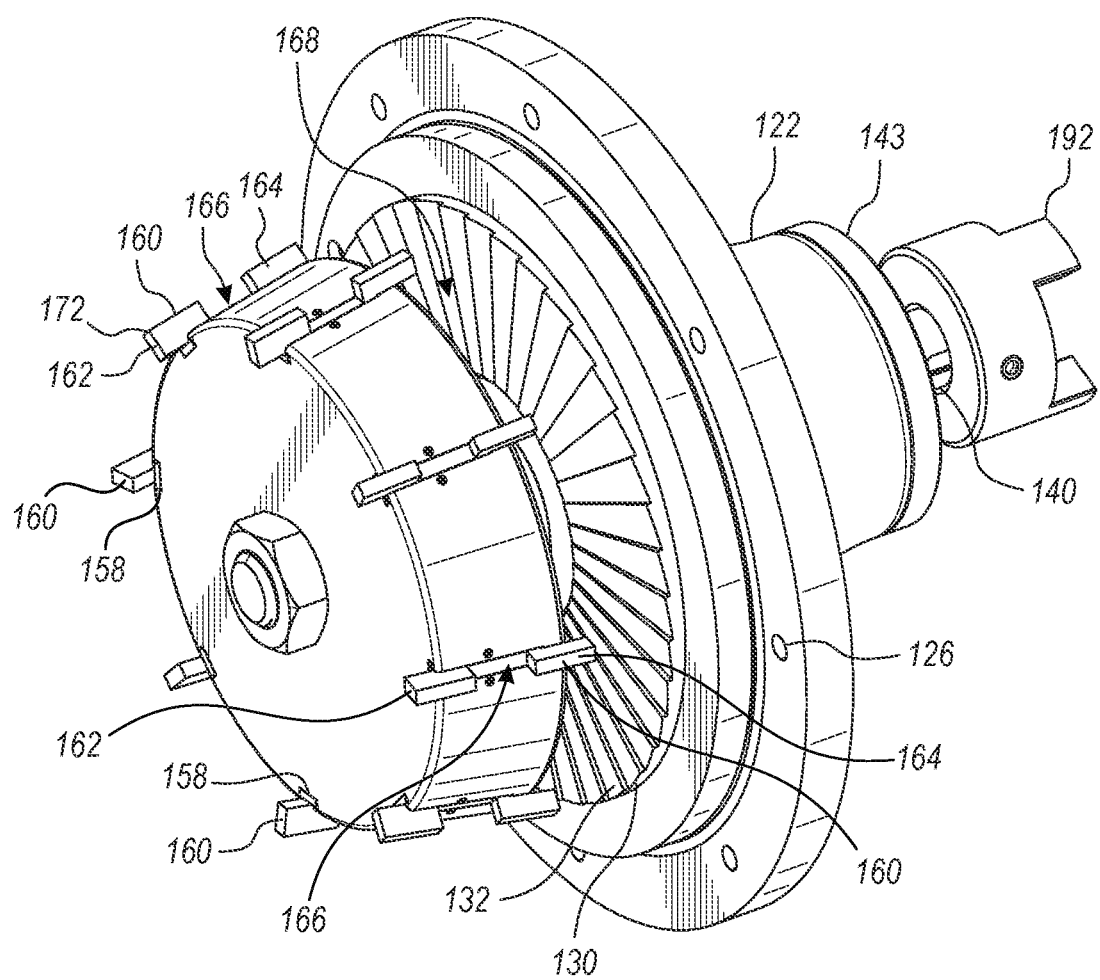
FIG. 8 illustrates a illustrates a rotor, a back plat stator, rotor blades, a driveshaft, and a driveshaft housing of a cavitation apparatus of a hydrodynamic cavitation system.
Figure 9:
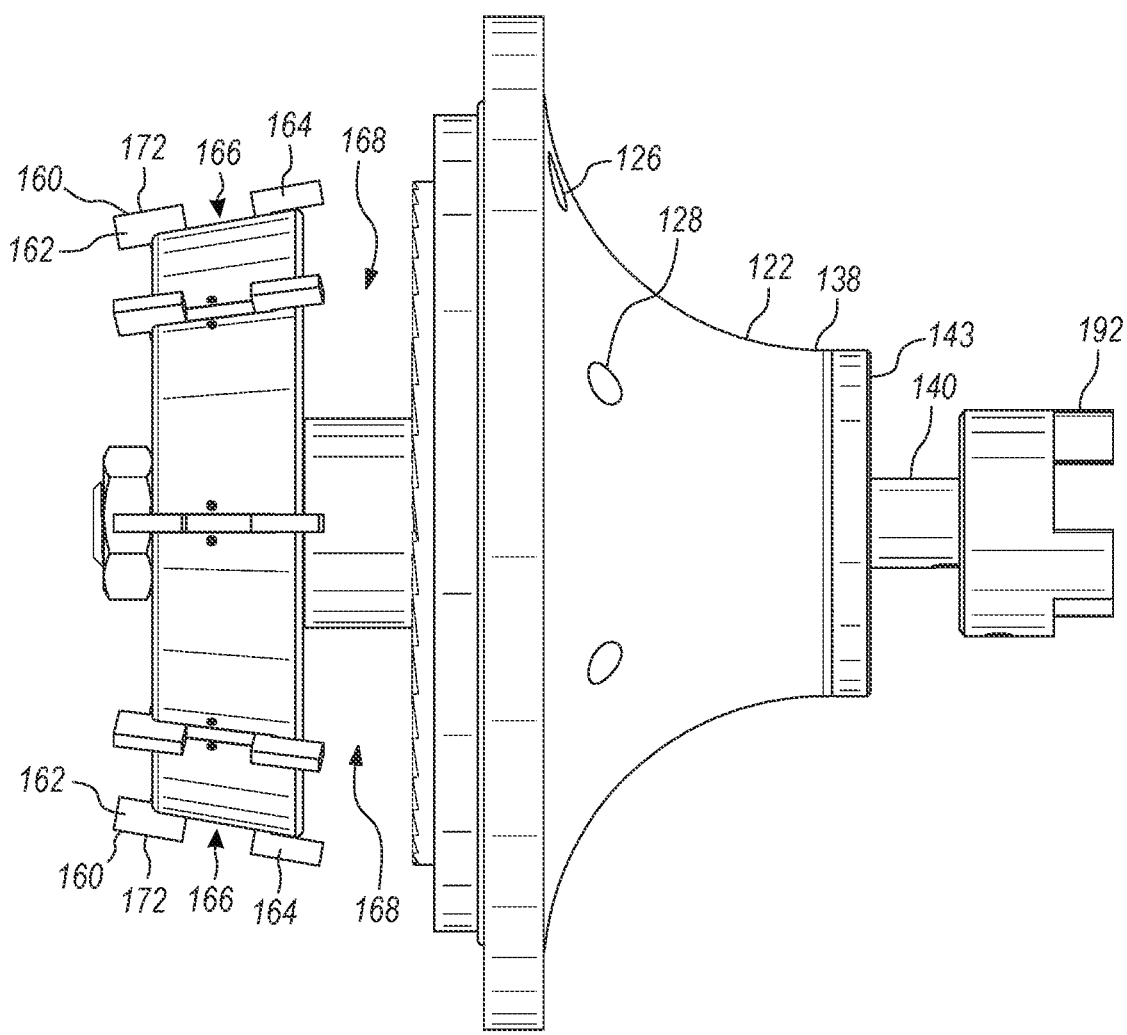
FIG. 9 illustrates a detailed, side elevation view of a rotor, a back plat stator, rotor blades, a driveshaft, and a driveshaft housing of a cavitation apparatus of a hydrodynamic cavitation system.

As best illustrated in FIGS. 4-5, the driveshaft 140 is coupled to a rotor 156. Referring to FIGS. 8-9, the rotor 156 may comprise one or more slots 158 and one or more rotor blades 160 that may be placed in and coupled (e.g., screwed) to the slots 158. In some embodiments, the rotor 156 may comprise eight slots and eight rotor blades 160, although that number may vary, as will be discussed later herein. In some embodiments, the rotor blades 160 may be angled to mirror the angle of the second stator 152. The cavitation apparatus 102 may comprise a first gap 168 between the rotor 160 and the first stator 130. The rotor blades 160 may comprise a first ridge 162, a second ridge 164, and a constriction 166 between the first and second ridges 162, 164. Returning to FIGS. 4 and 7, the cavitation apparatus 102 may comprise a second gap 170 between the one or more rotor blades 160 and the second stator 152, allowing for rotation of the rotor blades 160 within the second stator 152 without colliding therewith.

In some embodiments, the rotor blades 160 may be manufactured together with the rotor 156 as a single unit. It will be appreciated that in some embodiments, the number of rotor blades 160 can vary (e.g., one to ten or more), depending on the size of the housing 104 and the second stator 152 therein. Likewise, the quantity of rotor blades 160, either aligned or staggered apart from one another, may vary depending upon the embodiment. The greater the quantity of rotor blades 160, the greater the cavitation intensity is within the cavitation apparatus 102.

Figure 10:
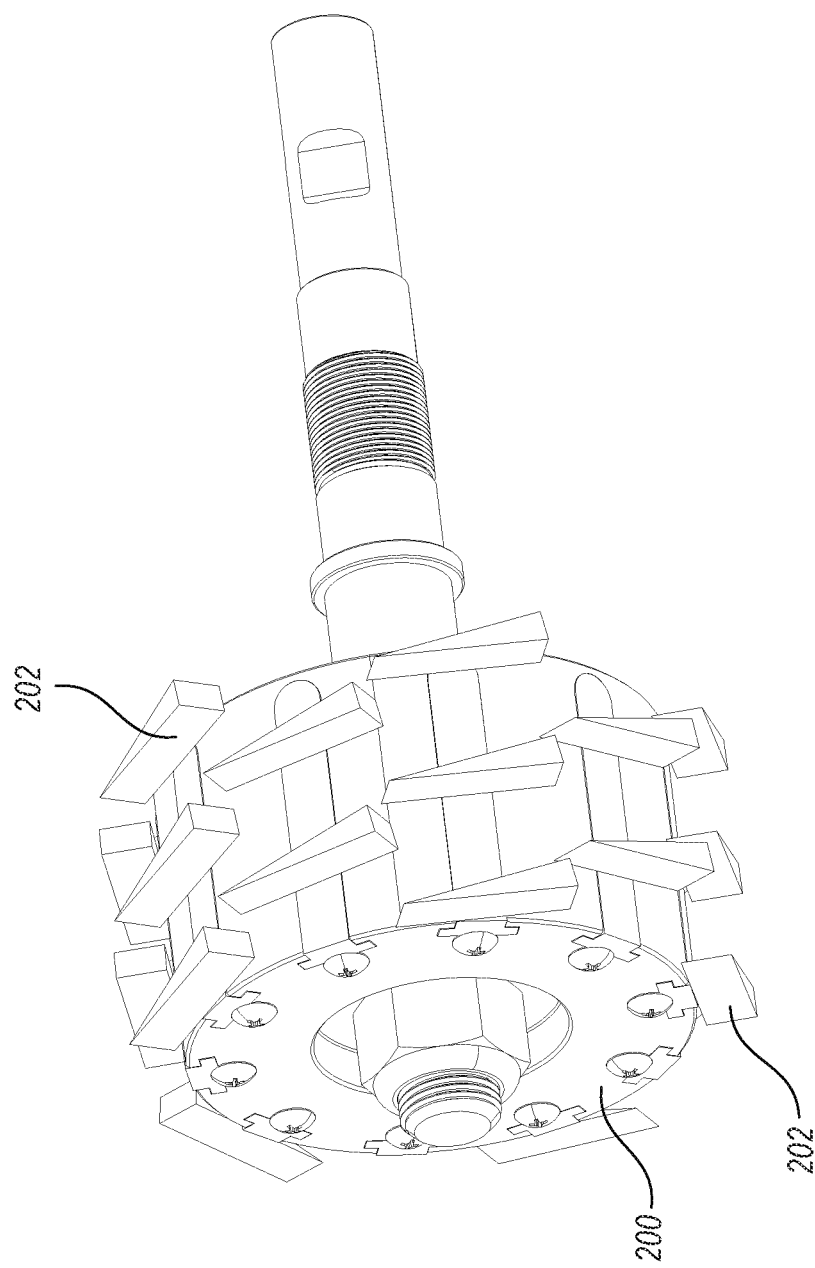
FIG. 10 illustrates a front, side perspective view of a rotor with rotor blades.
Figure 11:
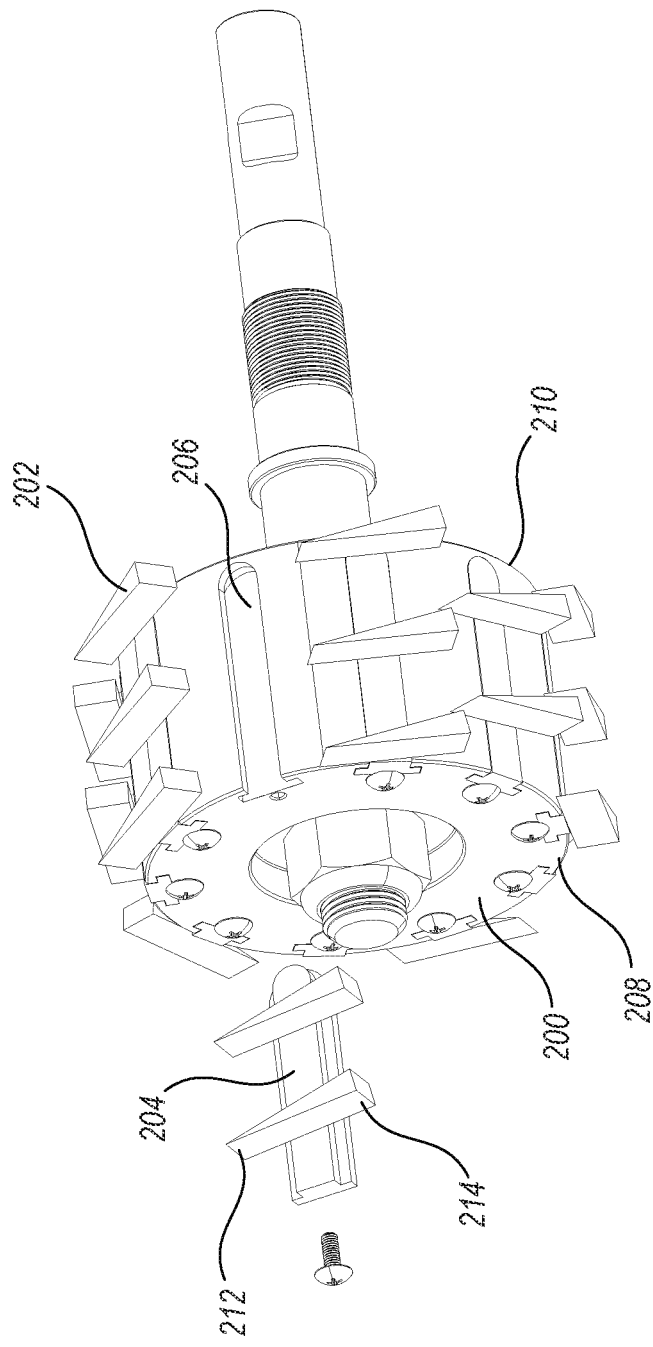
FIG. 11 illustrates a front, side perspective view of a rotor with one of the rotor blades disassembled therefrom.

For example, referring to FIGS. 10-13, the rotor shape and blade shape, number, and configuration may vary between embodiments. FIG. 10 illustrates a cylindrical rotor 200 comprising rotor blades 202 coupled thereto. As shown in FIG. 11, the rotor blades 202 may be easily removed and replaced or changed with other rotor blades 202 using a tongue 204 that is received within a respective groove 206 of the cylindrical rotor 200. This allows a user to replace blades 202 as needed or desired. However, while a tongue 204 and groove 206 is shown, it is not required and the blades may be coupled to the rotor 200 in other manners, such as through screws. The rotor blades 202 may be positioned along the cylindrical rotor 200 from a leading edge 208 to a rear edge 210 and may be positioned along substantially the entire outer surface of the cylindrical rotor 200 at spaced intervals. As will be appreciated, because the cylindrical rotor 202 is not tapered or cone shaped, the second stator 152 may also be cylindrical or otherwise complementary in shape to the cylindrical rotor 202. In some embodiments, the blades 202 need not be the same size and configuration to enable a cylindrical rotor 202 to fit within a tapered second stator 152.

Figure 12:
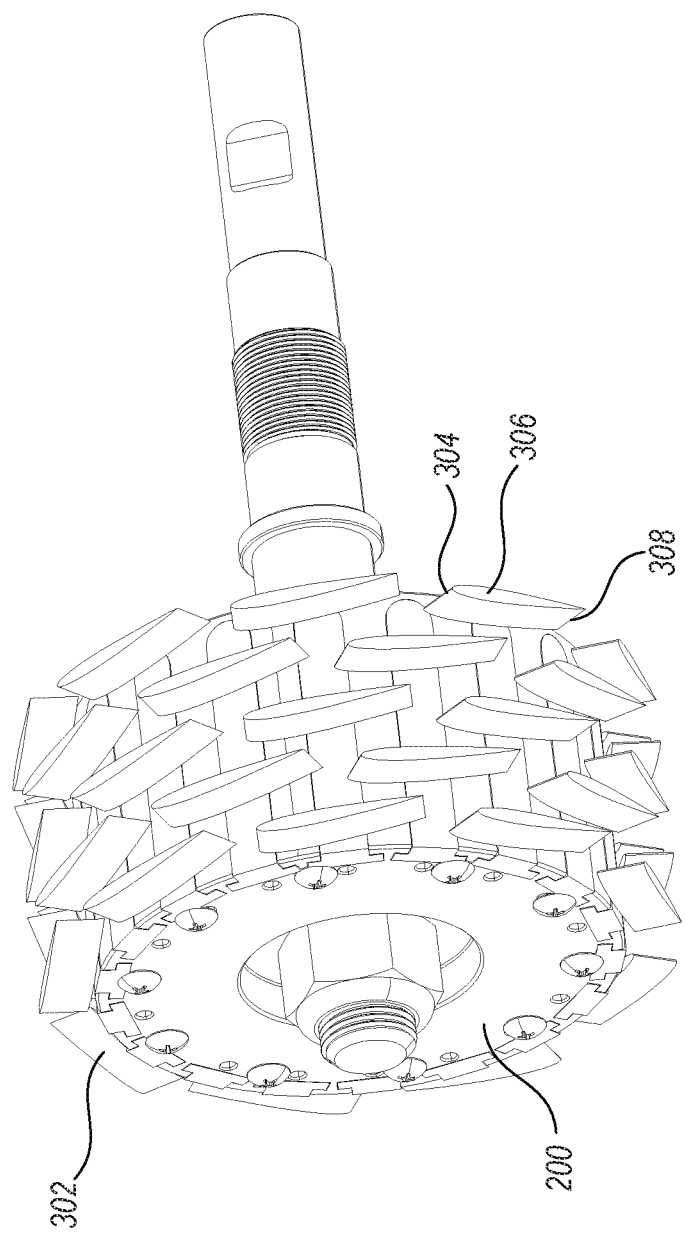
FIG. 12 illustrates a front, side perspective view of a rotor with rotor blades.
Figure 13:
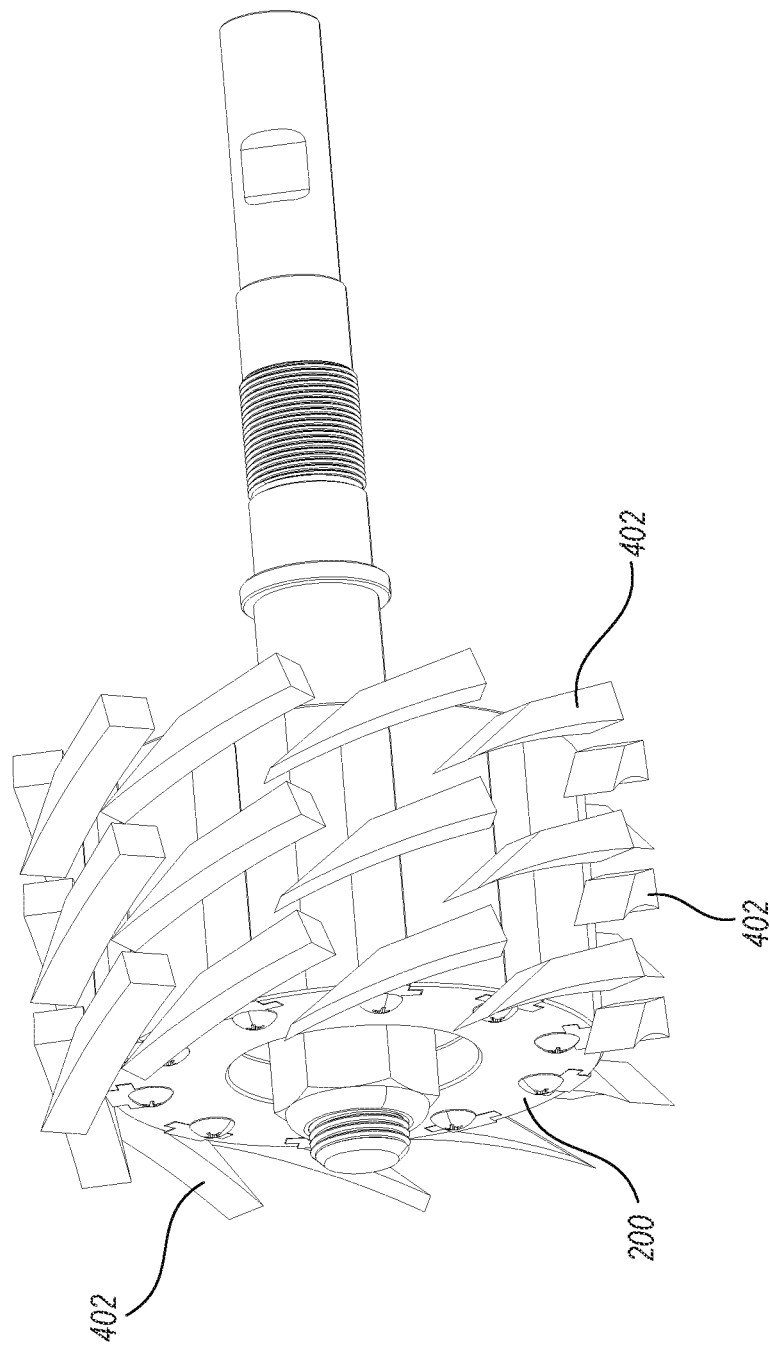
FIG. 13 illustrates a front, side perspective view of a rotor with rotor blades.

FIGS. 12-13 illustrate that the blades 302 and 402, respectively, may comprise varying formfactors and positioning (e.g., longitudinal, transverse, etc.) without departing herefrom. As appreciated, the greater the number of blades 160, 202, 302, 402, the greater the Venturi effect and the resulting cavitation. Additionally, in some embodiments, the blades 202, 302, and 402 may be shaped and positioned similar to a hydrofoil. For example, each blade 202, 302, 402 may comprise a leading edge and a trailing edge. In some embodiments, as shown in FIG. 12, the leading edge 304 may have a wider portion 306 than the trailing edge 308. However, in other embodiments, such as shown in FIGS. 10 and 13, the narrower end may be the leading end, allowing the blades 202 and 402 to "cut" through the water as they rotate. For example, referring to FIG. 11, the leading edge 212 is narrower than the trailing edge 214. It will be appreciated that blades 202, 302, 402, may be positioned such that the angle of attack of each blade 202, 302, 402, allows for the cavitation to "peel off" the blade—which creates a steady-state supercavitating cloud while causing minimal damage to the blades, rotor, and stator.

In some embodiments, the first gap 168 may comprise a distance between the first stator 130 and the rotor blades 160 that may range from 0.1-6.0 cm. In some embodiments, the second gap 170 may comprise a distance between the second stator 152 and the rotor blades 160 that may range from 0.1-6.0 cm. The speed of the rotor 156 ranges, in some embodiments, from 1,000-6,000 RPM, and is driven with indirect or direct drive from a motor with horsepower, which may range from 5-75 horsepower. While ranges are presented above, the cavitation apparatus 102 is not limited to those ranges and may, in some embodiments, function outside of the above ranges.

In some embodiments, the system 100 may also comprise a pump in line with the fluid inlet 110 that fills the cavitation system 102 with fluid for treatment and then emits treated fluid through the fluid outlet 112. The system 100 may also comprise oxidizing agents such as hydrogen peroxide or ozone in order to create free radicals that further facilitate the breakdown of organic and inorganic compounds in the fluid. The oxidizing agents may be administered via a time-release valve or consistently created by ozone generators. The addition of free radicals increases possible cavitation bubble location sites in the bulk of the liquid. The system 100 is a physical method that does not have a large energy cost associated with its operation, facilitating scalability in purifying large quantities of water.

Referring to FIGS. 4-9, due to the configuration of the cavitation apparatus 102, hydrodynamic cavitation occurs in four different regions: (1) on a leading edge 172 of the one or more rotor blades 160; (2) in the constriction 166 between the first and second ridges 162, 164 within the one or more rotor blades 160; (3) in a first gap 168 between the first stator 130 and the one or more rotor blades 160; and (4) in the second gap 170 between the second stator 152 and the one or more rotor blades 160. Referring to FIGS. 10-13, cavitation occurs between the blades 202, 302, 402.

It will be appreciated that a single cavitation site emits temperatures close to 4500° C. The temperature required to break the bond energy of most schedule I-V drugs through thermal decomposition is 300-500° C., which is far below the temperature that is created by a single cavitation site. As a result, the hydrodynamic cavitation system 100 very effectively disposes of nearly all organic and inorganic compounds including HAB and biomedical waste using the thermal decomposition, shear forces and shock waves from the cavitation. The resultant liquid has been studied for several schedule II drugs. Research shows the remaining compounds are not toxic and, at worst, create gray water, which can be disposed of relatively easily.

It will be appreciated that the four different regions optimize the hydrodynamic cavitation volume by increasing cavitation locations which can coalesce to become a steady-state supercavitating cloud, thereby breaking down more organic and inorganic compounds. It will further be appreciated that the system 100 is not limited to only treating HAB and may be used top breakdown many other types of harmful compounds. The prior art fails to maximize hydrodynamic cavitation location sites, causing the prior art to fail to solve the problems outlined herein. The system 100 utilizes four unique hydrodynamic cavitation locations ((1) on a leading edge 172 of the one or more rotor blades 160; (2) in the constriction 166 between the first and second ridges 162, 164 within the one or more rotor blades 160, or between the blades 202, 302, 402, respectively; (3) in a first gap 168 between the first stator 130 and the one or more rotor blades 160; and (4) in the second gap 170 between the second stator 152 and the one or more rotor blades 160) which create macro-cavitation, optimizing the efficiency of the system 100.

Additionally, each of the four different regions of hydrodynamic cavitation lead to the breakdown of biomedical waste, which can occur at three locations: (1) inside the vapor; (2) at the gas-liquid interface; and (3) in the liquid bulk. Breakdown of both HABs and biomedical waste at any of these three locations leads to the irreversible decomposition of the harmful organic and inorganic compounds.

It will be appreciated that the hydrodynamic cavitation system described herein is energy efficient, scalable, and reliable. The system 100 involves a physical method with comparatively minimal energy costs associated with its operation. The hydrodynamic cavitation system 100 may break down all schedule I, II, III, IV and V drugs and does not create any harmful or dangerous ash residue. The hydrodynamic cavitation system 100 hydrolyzes the schedule I-V drugs (in liquid, solid, or powder form) using water that is then run through the hydrodynamic cavitation system, which breaks down all the organic and synthetic chemical compounds, creating an irreversible, non-retrievable, and environmentally safe resultant liquid.

In some methods of use, a pump or valve (not shown) takes the liquid from a holding tank to the fluid inlet 110 where it enters into the chamber 198 (FIG. 4) formed by the second stator 152. Depending on the bulk liquid, a continuous mixer, centrifuge, grinder, or similar mechanism may be added inline to the inlet pipe 174 to create a viscosity that fits within the boundary conditions of the system 100. The ingoing flow rate, where Q is flow rate, may be controlled using a control valve (not shown) to restrict the cross-sectional area or by changing the diameter of the inlet pipe 174. A change in average fluid velocity, v, occurs when there is a change in cross-sectional area, A, of the flow: Q=A*v. The flow of liquid through the inlet 110 may be monitored using a manual valve or a digital flowmeter. Hydrogen peroxide or ozone may be added into the bulk liquid before entering the hydrodynamic cavitation system 100. This is added inline (i.e., prior to entering chamber 198) with the bulk liquid, after it goes through a means for mixing the bulk liquid. The means for mixing may comprise a continuous mixer, a centrifuge, a grinder, or similar known means of uniformly mixing a fluid before the ingoing flow rate is set. In one embodiment, the system 100 comprises one or more pressure gauges 194 (best seen in FIG. 6) coupled to the housing 104 which may be near the fluid inlet 110 to monitor the fluid pressure entering the cavitation apparatus 102. As the pump pushes the bulk liquid through the inlet 110, and the direct/indirect drive motor (not shown) with variable speed is spinning the rotor 156 at speeds between 2800-6000 RPM. As the bulk liquid initially enters through the inlet, there is some venting that needs to take place as the chamber 198 is slowly filled to its full volumetric capacity, which may be accomplished using vent 199 (FIGS. 1-2).

Once cavitation begins, the frequency of the bulk liquid will change, and there is an audible difference. The cavitation apparatus 100 may comprise a hydrophone 196 (FIGS. 1-3) that measures the delta in frequency, permitting a user to further confirm that cavitation is taking place by reviewing the range of the frequency. A liquid sample is taken from the fluid inlet 110 and from the fluid outlet 112. These samples can then be sent to third party water analysis companies to check for coliform. Specifically, for HAB testing applications, a user reviews the samples from the fluid inlet 110 for algal cells that are living, a user also looks for living as well as dead algal cells from the sample collected at the fluid outlet 112 under a microscope. A user may then compare the concentration of these cells from before and after treatment to understand the log kill resulting from the system 100. Analysis reports conducted by water testing facilities show that the system 100 is capable of removing over 90% of organic and inorganic material from water (i.e., a 90% reduction in organic and inorganic material from water collected at the inlet 110 as compared to water collected from the outlet 112. Coliform bacteria, in particular, has been demonstrated to be removed below minimum detection limits.

Accordingly, the hydrodynamic cavitation system 100 solves the need for a system that breaks down organic and inorganic compounds for use in various industrial applications including the remediation of HAB and the disposal of biomedical waste without biomanipulation, prefiltration, secondary treatment, secondary pollution, and limitations in scaling due to energy cost constraints, thereby overcoming the prior art.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure. Additionally, it will be appreciated that the inclusion and placement of sensors, windows, handles, doors, etc. may be changed or removed without departing herefrom. Further, the size and shape of components may also vary without departing herefrom.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A hydrodynamic cavitation system, comprising:
    a housing, the housing comprising a fluid inlet and a fluid outlet;
    a first stator coupled to the housing and comprising angled ridges on a first side;
    a second stator coupled to an interior of the housing and comprising ridges on an interior surface;
    a rotor positioned within the second stator, the rotor comprising a plurality of rotor blades;
    a driveshaft coupled to the rotor and extending outwardly from the housing, the driveshaft configured to be driven by a motor; and
    wherein as the driveshaft rotates, the rotor rotates within the second stator.

2. The hydrodynamic cavitation system of claim 1, wherein the plurality of rotor blades each comprise a first ridge, a second ridge, and a constriction between the first ridge and the second ridge.

3. The hydrodynamic cavitation system of claim 1, wherein the rotor blades are positioned around the outer surface of the rotor and from a leading edge of the rotor to a rear edge of the rotor at spaced intervals.

4. The hydrodynamic cavitation system of claim 1, further comprising a door coupled to an exterior surface of the housing and one or more clamps, coupled to the housing, configured to seal and unseal the door.

5. The hydrodynamic cavitation system of claim 1, further comprising a hydrophone configured to measure the delta of frequency within the hydrodynamic cavitation system.

6. The hydrodynamic cavitation system of claim 1, wherein a distance between the first stator and the rotor is 0.1-6.0 cm.

7. The hydrodynamic cavitation system of claim 1, wherein a distance between the second stator and the rotor is 0.1-6.0 cm.

8. The hydrodynamic cavitation system of claim 1, further comprising a pressure gauge coupled to the housing.

9. A hydrodynamic cavitation system, comprising:
a housing, the housing comprising a fluid inlet and a fluid outlet;
a first stator coupled to the housing and comprising angled ridges on a first side;
a second stator positioned within the housing and comprising angled ridges on an interior surface;
a rotor positioned within the second stator, the rotor comprising a plurality of rotor blades positioned to form constrictions therebetween;
a driveshaft coupled to the rotor and configured to rotate the rotor within the second stator, the driveshaft extending from the rear of the housing;
a fluid inlet configured to receive bulk fluid comprising organic and inorganic compounds;
a chamber, formed by the second stator, that receives the bulk fluid for cavitation; and
an outlet configured to output fluid that has passed through cavitation.

10. The hydrodynamic cavitation system of claim 9, wherein the plurality of rotor blades each comprise a first ridge, a second ridge, and a constriction between the first ridge and the second ridge.

11. The hydrodynamic cavitation system of claim 9, wherein the rotor blades are positioned around the outer surface of the rotor and from a leading edge of the rotor to a rear edge of the rotor at spaced intervals.

12. The hydrodynamic cavitation system of claim 9, further comprising a door coupled to an exterior surface of the housing and one or more clamps, coupled to the housing, configured to seal and unseal the door.

13. The hydrodynamic cavitation system of claim 9, further comprising a hydrophone configured to measure the delta of frequency within the hydrodynamic cavitation system.

14. The hydrodynamic cavitation system of claim 9, wherein a distance between the first stator and the rotor is 0.1-6.0 cm.

15. The hydrodynamic cavitation system of claim 9, wherein a distance between the second stator and the rotor is 0.1-6.0 cm.

16. The hydrodynamic cavitation system of claim 9, further comprising a pressure gauge coupled to the housing.

17. A method of using a hydrodynamic cavitation system, the method comprising:
pumping fluid into the hydrodynamic cavitation system through a fluid inlet and into a chamber for processing, the chamber comprising a stator with a plurality of ridges;
actuating a driveshaft causing rotation of a rotor within the stator, the rotation of the rotor generating hydrodynamic cavitation within the chamber; and
outputting the processed fluid through a fluid outlet.

18. The method of claim 17, further comprising adding one or more oxidizing agents to the fluid before the fluid encounters hydrodynamic cavitation within the hydrodynamic cavitation system.

19. The method of claim 17, further comprising passing the bulk fluid through a continuous mixer, centrifuge, or grinder before passing it through the fluid inlet.

20. The method of claim 17, wherein the rotor generates hydrodynamic cavitation:
i. on a leading edge of one or more rotor blades;
ii. in a gap between a first stator and each rotor blade, and
iii. in a gap between a second stator and each rotor blade.

* * * * *